United States Patent [19]

Koya et al.

[11] Patent Number: 4,650,511
[45] Date of Patent: Mar. 17, 1987

[54] METHOD FOR THE PREPARATION OF A DEHYDRATED QUARTZ GLASS MATERIAL FOR LIGHT TRANSMISSION

[75] Inventors: Kazuo Koya; Yoshiharu Konya, both of Gunma, Japan

[73] Assignee: Shin-Etsu Chemical Co., Ltd., Tokyo, Japan

[21] Appl. No.: 739,876

[22] Filed: May 31, 1985

[30] Foreign Application Priority Data

Jun. 4, 1984 [JP] Japan .................................. 59-114318

[51] Int. Cl.$^4$ ........................ C03C 23/00; C03B 29/00
[52] U.S. Cl. ............................... 65/30.1; 65/DIG. 16
[58] Field of Search ............... 65/30.1, 3.12, 17, 18.2, 65/DIG. 16

[56] References Cited

U.S. PATENT DOCUMENTS 4,263,030  4/1981  Kobayashi ........................ 65/30.1 X

FOREIGN PATENT DOCUMENTS 59-92936  5/1984  Japan ............................ 65/DIG. 16
2038311   7/1980  United Kingdom ......... 65/DIG. 16

Primary Examiner—Kenneth M. Schor
Attorney, Agent, or Firm—Wenderoth, Lind & Ponack

[57] ABSTRACT

The invention provides an efficient method for the dehydration, i.e. removal of silicon-bonded hydroxy groups, of a porous silica body before vitrification as a precursor of quartz glass-made optical fibers obtained by the flame hydrolysis of a silicon compound and deposition of fine silica particles formed therefrom. The problems and disadvantages accompanying the use of conventional dehydrating agents can be solved in the invention by heating the hydroxy-containing porous silica body at 1000° to 1300° C. in an atmosphere containing thionyl fluoride or sulfuryl fluoride as the dehydrating agent which is also effective as a dechlorinating agent so that the optical fibers prepared from the quartz glass material of the invention are highly transparent and resistant against hydrogen-containing atmosphere at elevated temperatures.

4 Claims, 1 Drawing Figure

FIGURE
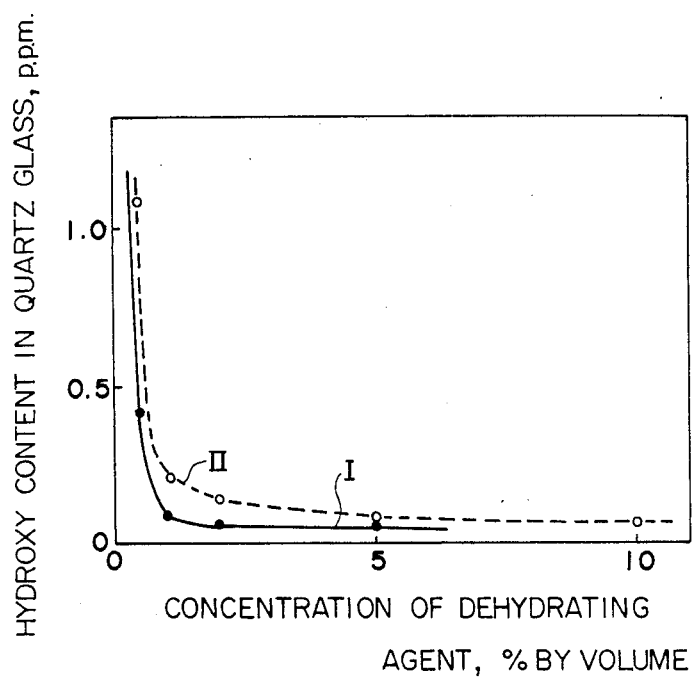

METHOD FOR THE PREPARATION OF A DEHYDRATED QUARTZ GLASS MATERIAL FOR LIGHT TRANSMISSION

BACKGROUND OF THE INVENTION

The present invention relates to a method for the preparation of a dehydrated quartz glass material for light transmission or, more particularly, to a method for the preparation of a dehydrated quartz glass material for light transmission containing substantially no residual chlorine as an impurity which increases the transmission loss of light through the quartz glass.

As is known, optical fibers used for the communication technology by light transmission are usually manufactured by spinning a quartz glass material which is produced by the deposition of fine silica particles formed by the flame hydrolysis of a hydrolyzable or oxidatively decomposable silicon compound, e.g. silicon tetrachloride, in a high-temperature flame, e.g. oxyhydrogen flame, on a substrate body to be grown in a porous cylindrical silica body which is then vitrified by heating at a temperature around or above the melting point of silica in a high-temperature furnace into a transparent fused quartz glass body.

One of the problems in the above described method for the preparation of a quartz glass body for light transmission is that a considerably large amount of hydroxy groups is contained in the fused quartz glass body as a natural consequence of the moisture content in the oxyhydrogen flame so that the optical fiber obtained from such a quartz glass body as such by spinning is not suitable for the purpose of light transmission due to the decreased efficiency or increased loss in the light transmission by the impurity hydroxy groups.

As a remedy for this drawback, it is a usual practice that the hydroxy groups are dehydrated and removed from the quartz glass material by exposing the porous silica body before vitrification in a high temperature atmosphere containing chlorine or a chlorine compound such as thionyl chloride. This method is also not free from problems and disadvantages. Although the transmission loss by the hydroxy impurity can be reduced, the quartz glass material unavoidably contains chlorine as another impurity which causes problems in a different way. Namely, the chlorine impurity in a quartz glass material is not responsible for the light absorption in a wave length region of 0.6 to 1.5 $\mu m$ frequently used in the communication by light transmission but, as is understood from the comparison of the bond energy between silicon and chlorine atoms and that between silicon and oxygen atoms, the former value being definitely smaller than the latter value, the silicon-to-chlorine linkage is subject to scission or breaking during a long-term service of the optical fiber or when the optical fiber is heated at an elevated temperature to form structural defects responsible for the increase of the light transmission loss. This problem of increased light transmission loss by the chlorine impurity is more serious when the optical fiber is used in an atmosphere containing a relatively high concentration of hydrogen gas or moisture. In short, optical fibers prepared from a chlorine-containing quartz glass material are not satisfactory in respect of the long-term stability and reliability.

In order to solve this problem advantageously, it has been proposed to treat the porous silica body with fluorine gas or a gaseous fluorine compound, such as fluorinated or fluorochlorinated hydrocarbons, e.g. tetrafluoromethane and difluorodichloromethane, in place of chlorine or a chlorine compound to introduce silicon-to-fluorine linkages having a larger bond energy than the silicon-to-oxygen linkage into the quartz glass. The use of fluorine gas in the above purpose is, however, not practicable because the excessively high reactivity of fluorine with siliceous materials causes erosion and dissipation of the silica material from the porous body in the form of silicon tetrafluoride. The above mentioned fluorine compounds, on the other hand, are chemically extremely stable so that the desired effect of dehydration can be obtained only by the use thereof in an excessively large amount while loss of the silica material in the form of silicon tetrafluoride is also unavoidable by the use of such a large amount of the fluorine compound. Moreover, the carbon content in the fluorine compound acts as a reducing agent on the silica $SiO_2$ into more volatile silicon monoxide SiO to increase the amount of silica dissipation and also is responsible for the increased carbon content and formation of oxygen deficiency in the quartz glass material.

SUMMARY OF THE INVENTION

An object of the present invention is to provide an efficiently dehydrated quartz glass material free from the above described problems and disadvantages in the prior art quartz glass products for light transmission.

Another object of the invention is to provide a novel method for the preparation of a quartz glass material as mentioned above including the step of dehydrating of a porous silica body before vitrification.

Thus, the method of the present invention for the preparation of a dehydrated quartz glass material comprises the steps of:

(a) heating a porous silica body, which is usually obtained by the deposition of fine silica particles produced in the flame hydrolysis of a silicon compound in a high-temperature flame, in an atmosphere containing an oxyfluoride of sulfur, such as thionyl fluoride $SOF_2$ and sulfuryl fluoride $SO_2F_2$, at a temperature in the range, for example, from 1000° to 1300° C.; and (b) vitrifying the porous silica body by heating at a temperature in the range, for example, from 1300° to 1600° C. into a transparent quartz glass body.

Alternatively, the above mentioned steps (a) and (b) can be performed concurrently by heating the porous silica body somewhat prolongedly in an atmosphere containing an oxyfluoride of sulfur at a temperature in the range from 1000° to 1600° C.

BRIEF DESCRIPTION OF THE DRAWING

The FIGURE of the accompanying drawing shows the content of hydroxy groups in the quartz glass material prepared in Example 3 as a function of the concentration of the dehydrating agent in the atmosphere of helium gas.

DETAILED DESCRIPTION OF THE PREFERRED EMBODIMENTS

As is understood from the above description, the most characteristic feature of the inventive method is in the unique selection of the dehydrating agent contained in the atmosphere in which the porous silica body is heated. Namely, a porous silica body containing hydroxy groups, probably, in the form of a silanolic hydroxy group Si—OH is heated in an atmosphere containing an oxyfluoride of sulfur such as thionyl fluoride and sulfuryl fluoride as the dehydrating agent so that the silanolic hydroxy group reacts with the dehydrating agent, assuming that the dehydrating agent is thionyl fluoride, according to the equation:

$$-Si-OH + SOF_2 \rightarrow -Si-F + SO_2 + HF;$$

and the hydrogen fluoride formed here is effective to react with and remove the chlorine impurity originating in the starting silicon compound, e.g. silicon tetrachloride, and sometimes contained in the silica according to the equation:

$$-Si-Cl + HF \rightarrow -Si-F + HCl.$$

These reactions proceed so efficiently that complete replacement of the silicon-bonded hydroxy groups and chlorine atoms can be obtained even when the concentration of the oxyfluoride of sulfur in the heating atmosphere is much lower than in the use of the fluorinated hydrocarbon compounds so that the advantages of the inventive method are not limited to the excellent performance of the resultant dehydrated quartz glass material but include the absence of the problem of corrosion in the apparatus used in the treatment.

As is described above, the starting material used in the step (a) of the inventive method is a porous silica body which is typically in a cylindrical form and poduced, though not limitative, usually by the deposition of fine silica particles formed by the flame hydrolysis of a hydrolyzable or oxidatively decomposable silicon compound such as silicon tetrachloride in a high-temperature flame such as oxyhydrogen flame on to a substrate. Most of suitable starting silicon compounds are represented by the general formula $R_mSiX_{1-m}$, in which R is a hydrogen atom or a monovalent hydrocarbon group, e.g. methyl and ethyl groups, X is an atom of halogen, e.g. chlorine and fluorine, or an alkoxy group, e.g. methoxy and ethoxy groups, and m is zero or a positive integer not larger than 4. Particularly exemplary of such a silicon compound are silicon tetrachloride, silicon tetrafluoride, trichlorosilane, silane, methyl trichlorosilane, methyl trimethoxysilane, tetramethoxysilane, tetraethoxysilane and the like, of which silicon tetrachloride is preferred in view of the availability of high-purity products. In addition to the above mentioned silicon compounds, the gaseous feed to the oxyhydrogen flame may contain, if desired, a dopant for the modification, i.e. increase or decrease, of the refractive index of the resultant quartz glass material, including, for example, halides and alkoxides of elements of germanium, aluminum, titanium, phosphorus, boron and the like exemplified by germanium tetrachloride, aluminum chloride, titanium tetrachloride, phosphoryl chloride and boron tribromide as the preferable ones.

The fine silica particles formed by the flame hydrolysis of the starting silicon compound, optionally, admixed with one or more of the above mentioned dopant compounds are deposited on a target substrate at which the flame carrying the silica particles from an oxyhydrogen burner is blown while the target substrate is continuously rotated around its own axis with concurrent gradual retraction in the axial direction so that the deposition of the silica particles thereon grows into a cylindrical porous silica body. Alternatively, the oxyhydrogen flame carrying the silica particles is blown at a rotating mandrel of a refractory material, e.g. quartz glass and carbon, which is in a reciprocative movement back and forth at controlled velocity relative to the burner so that the porous deposition of the silica particles is grown on and around he mandrel in the radial direction thereof. Subsequent pulling-out of the mandrel gives a porous silica body in a tubular form. When the mandrel is made of a high-purity quartz glass, a precursor base material of optical fibers can be obtained by the direct vitrification of the porous silica body on the mandrel without pulling out the mandrel.

At any rate, the porous silica body obtained in the above described manner has a bulk density of about 0.1 to about 0.5 g/cm$^3$ and highly permeable to various gases and contains large amounts of water, hydroxy groups and chlorine atoms as impurities produced in the flame hydrolysis in an adsorbed or bonded form. The scope of the inventive method is in the upgrading treatment of the thus prepared porous silica body by dehydration and dechlorination therefrom followed by vitrification into a transparent quartz glass material. The dehydrating and dechlorinating treatment is performed by heating the porous silica body in an atmosphere containing an oxyfluoride of sulfur at a temperature in the range, preferably, from 1000° to 1300° C. so that the silicon-bonded hydroxy groups and chlorine atoms react with the sulfur oxyfluoride and hydrogen fluoride, respectively, according to the previously given reaction equations. The vitrification of the thus dehydrated and dechlorinated porous silica body is performed by heating the same at a temperature, preferably, in the range from 1300° to 1600° C. It is of course that the reactions of dehydration and dechlorination and the vitrification proceed concurrently when the porous silica body is heated in an atmosphere containing the sulfur oxyfluoride at a temperature in the range from 1000 to 1600° C. without separately undertaking the steps.

The oxyfluoride of sulfur used as the dehydrating agent in the inventive method is preferably thionyl fluoride $SOF_2$ or sulfuryl fluoride $SO_2F_2$ in view of the reactivity with the hydroxy groups bonded to the silicon atoms, availability of high-purity products, stability, storability in a metal-made container and easiness in handling.

The gaseous constituent of the atmosphere which serves as a diluent or carrier of the above mentioned dehydrating agent may be helium, argon, nitrogen, oxygen or a mixture thereof. Helium is preferred by virtue of the high diffusibility into the porous silica body. The preferable concentration of the sulfur oxyfluoride in the atmospheric gas is usually in the range from 0.01 to 10% by volume or, more preferably, from 0.1 to 1% by volume. The desired effects of dehydration and dechlorination can be obtained only insufficiently when the concentration thereof is too low while an excessively high concentration thereof may cause troubles of silica dissipation and formation of residual bubbles in the finished quartz glass material. The length of time taken for the dehydration and dechlorination treatment is usually in the range from 1 to 3 hours though dependent on various parameters.

The dehydrated quartz glass material obtained according to the inventive method contains an amount of fluorine by the replacement of the hydroxy groups and chlorine atoms in the starting porous silica body so that the quartz glass material has a somewhat decreased refractive index. Therefore, the inventive method is particularly useful when the quartz glass material is used as a quartz glass tube for the cladding layer of optical fibers having a core-and-cladding structure.

In the following, the method of the present invention is described in more detail by way of examples.

EXAMPLE 1

Fine silica particles were formed by the flame hydrolysis of gasified silicon tetrachloride at a rate of 430 ml/minute introduced into an oxyhydrogen flame on a quadruply multi-tubular burner of quartz glass to which hydrogen gas and oxygen gas were supplied at rates of 10 liters/minute and 16 liters/minute, respectively, and the flame carrying the silica particles was blown at an end of a rotating substrate rod so that the deposition of the silica particles was grown in the axial direction of the rod to form a cylindrical porous silica body.

This porous silica body was heated first at 1200° C. for 2 hours in as atmosphere of helium containing 0.5% by volume of thionyl fluoride and then at 1500° C. for 3 hours in an atmosphere of pure helium gas so that the porous silica body was vitrified into a transparent quartz glass body, in which the contents of hydroxy groups and chlorine atoms were as low as 50 p.p.b. and 5 p.p.m., respectively. The quartz glass body was excellent as a base material of optical fibers for light transmission.

EXAMPLE 2

A cylindrical porous silica body prepared in the same manner as in Example 1 was put into an electric furnace and heated in an atmosphere of helium gas containing 0.5% by volume of sulfuryl fluoride at a rate of temperature increase of 5° C./minute from 1000° to 1500° C. followed by keeping at 1500° C. for about 2 hours so that the porous silica body was vitrified into a transparent quartz glass body, in which the contents tents of hydroxy groups and chlorine atoms were as low as 30 p.p.b. and 5 p.p.m., respectively.

COMPARATIVE EXAMPLE 1

The procedure was substantially the same as in Example 2 except that the atmospheric gas inside the electric furnace was pure helium throughout the heating treatment. The resultant transparent quartz glass body contained 50 p.p.m. of hydroxy groups and 80 p.p.m. of chlorine atoms.

COMPARATIVE EXAMPLE 2

The procedure was substantially the same as in Example 2 except that the atmospheric gas inside the electric furnace was helium containing 5% by volume of chlorine throughout the heating treatment. The resultant transparent quartz glass body contained 50 p.p.m. of hydroxy groups and 250 p.p.m. of chlorine atoms.

COMPARATIVE EXAMPLE 3

The procedure was substantially the same as in Example 2 except that the atmospheric gas inside the electric furnace was helium containing 5% by volume of thionyl chloride throughout the heating treatment. The resultant transparent quartz glass body contained 60 p.p.b. of hydroxy groups and 300 p.p.m. of chlorine atoms.

EXAMPLE 3 and COMPARATIVE EXAMPLE 4

The procedure was substantially the same as in Example 1 except that the concentration of thionyl fluoride in the atmospheric helium gas was varied. The transparent quartz glass bodies obtained in this manner were analyzed for the content of hydroxy groups to give the results shown by the curve I in FIG. 1.

For comparison, the same experimental procedure as above was repeated by replacing the thionyl fluoride with the same volume concentration of chlorine to give the contents of hydroxy groups in the quartz glass bodies shown by the curve II in the same figure. These comparative resulta clearly support that the dehydrating power of thionyl fuoride is much larger than chlorine

EXAMPLE 4

Cylindrical porous silica bodies doped with germanium oxide were prepared in the same manner as in Example 1 and they were subjected to the heat treatment under the same temperature conditions as in Example 2 one in an atmosphere of helium containing 5% by volume of chlorine and the other in an atmosphere of helium containing 1% by volume of thionyl fluoride to give dehydrated and vitrified quartz glass rods A and B, respectively.

Each of the quartz glass rods A and B was put into a high-purity quartz glass tube for cladding and integrated therewith by fusion followed by melt-spinning from an electric furnace at 2200° C. to give an optical fiber having an outer diameter of 125 $\mu$m and a core diameter of 50 $\mu$m. The thus prepared optical fibers each in a length of 500 meters were heated for 72 hours at 200° C. in the presence of hydrogen gas and the absorption loss of light therethrough was determined at a wave length of 1.39 $\mu$m either before or after the above described heat treatment to give results that the absorption loss in the optical fiber A increased from 3.2 to 9.1 dB/km by the heat treatment while the absorption loss in the optical fiber B increased from 2.4 to 3.3 dB/km by he treatment. Thus, it is clear that the inventive method of dehydration is very effective in respect of the resistance of optical fibers against hydrogen at elevated temperatures.

What is claimed is:

1. A method for the preparation of a dehydrated quartz glass material which comprises the steps of:
   (a) heating a porous silica body containing hydroxy groups in an atmosphere containing an oxyfluoride of sulfur selected from the class consisting of thionyl fluoride $SOF_2$ and sulfuryl fluoride $SO_2F_2$ at a dehydration temperature in the range from 1000° to 1300° C. to produce a dehydrated porous silica body; and
   (b) vitrifying the dehydrated porous silica body by heating at a vitrification temperature in the range from 1300° to 1600° C. into a transparent quartz glass body.

2. The method as claimed in claim 1 wherein the starting porous silica body has a bulk density in the range from 0.1 to 0.5 g/cm$^3$.

3. The method as claimed in claim 1 wherein the atmospheric gas in the step (a) is helium gas containing from 0.01 to 10% by volume of the oxyfluoride of sulfur.

4. A method for the preparation of a dehydrated quart material which comprises dehydrating a porous silica body containing hydroxy groups in an atmosphere containing an oxyfluoride of sulfur selected from the class consisting of thionyl fluoride $SOF_2$ and sulfuryl fluoride $SO_2F_2$ and vitrifying the porous silica body, said dehydrating and vitrifying reactions being carried out by heating the porous silica body at a temperature range of 1000° to 1600° C. for a sufficient time to first dehydrate the porous body at lower dehydration temperatures within said temperature range and then vitrify the dehydrated body into a transparent quartz body at higher vitrification temperatures within said temperature range.

* * * * *